(No Model.)
F. KOCH.
SINGLE DELIVERY PILL BOX.
No. 448,350. Patented Mar. 17, 1891.
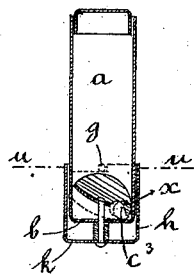
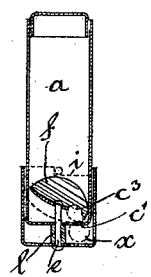
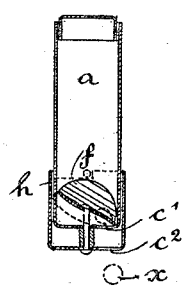
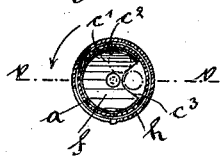
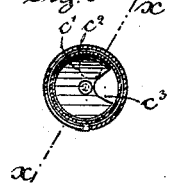
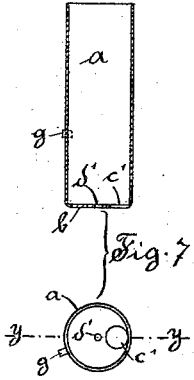
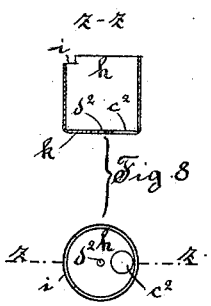
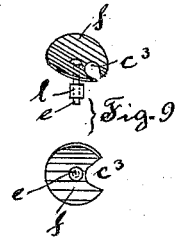
Witnesses
E. L. Clemens
A. J. Madden
Inventor
Friedrich Koch
by A. H. Madden
Attorney

UNITED STATES PATENT OFFICE.

FRIEDRICH KOCH, OF BERLIN, GERMANY.

SINGLE-DELIVERY PILL-BOX.

SPECIFICATION forming part of Letters Patent No. 448,350, dated March 17, 1891.

Application filed July 8, 1890. Serial No. 358,114. (No model.)

*To all whom it may concern:*

Be it known that I, FRIEDRICH KOCH, a subject of the Emperor of Germany, residing at Schöneberger, ufer No. 10, Berlin, in Germany, have invented a certain new and useful Improvement in a Single-Delivery Pill-Box, of which the following is a specification.

This invention relates to boxes for holding pills and the like; and it consists in a receptacle for said pills, having means for allowing said pills to be delivered one by one from the receptacle.

Reference being made to the accompanying drawings, Figures 1, 3, and 5 are respectively vertical central sections on lines $v\,v$, $w\,w$, and $x\,x$ of Figs. 2, 4, and 6, the latter being respectively cross-sections of Figs. 1, 3, and 5 on the line $u\,u$ of Fig. 1, said Figs. 1 to 6 showing the improved pill-receptacle and delivery device in different positions. Figs. 7, 8, and 9 show the different separate parts, each in two views, as will be readily understood on reference to said figures.

The box $a$, which contains the pills, has in its bottom $b$ the opening $c'$, sufficient for the passage of one pill, and also a central hole $d'$, through which the spindle $e$ of the disk $f$ extends. On the side of the box $a$ is fixed the small pin $g$. The box $a$ is surrounded at the bottom by the capsule $h$, which has an opening $c^2$ in its base for delivering a pill and a hole $d^2$ for receiving the spindle $e$. The capsule $h$ rotates on the box $a$, and this rotation is limited by the notch $i$ in the edge of the capsule, in connection with the pin $g$, located on the box. The spindle $e$ is fixed in the hole $d^2$ of the capsule, and extends loosely through the hole $d'$ into the box $a$, and there carries a disk $f$, which therefore during a rotation of the capsule will rotate likewise within the box. The disk $f$ is inclined and curved or dished, and has the notch or hole $c^3$, large enough for allowing a pill to pass through. The position of the lower opening $c^2$ and of the notch $c^3$, which are in fixed relation one to the other, is arranged so that the one does not coincide with the other, Fig. 8, while the opening $c'$ of the box $a$, located between both, corresponds, during the rotation of the capsule, first with the notch $c^3$ and then with the opening $c^2$. The bottoms $b$ and $k$ of the box and capsule, respectively, are kept apart somewhat less than the diameter of the pill by a small washer or block $l$.

For the sake of clearness, one pill $c$ only is shown in dotted lines in the box $a$.

In Figs. 1 and 2 the pill rolls over the oblique disk $f$ into the notch $c^3$ and arrives upon the bottom $b$ of the box $a$. The box being held in one hand, the capsule $h$, with disk $f$, is turned to the left with the other hand as far as the pin $g$ and the notch $i$ permit. By this rotation the notch $c^3$ will come just above the opening $c'$. The pill will therefore fall through the latter upon the bottom $k$ of the capsule $h$, Figs. 3 and 4. Said pill, however, still projects partly into the opening $c'$, so that with the rotation of the capsule, now made back to the right, the pill, sliding underneath the disk $f$, is kept in the opening $c'$ until the latter and the opening $c^2$ coincide, when the pill falls out at $c^2$, Fig. 5. The opening $c'$ is during this period covered again by the disk $f$, so that no pill can follow; but another pill will have rolled into the notch $c^3$, so that when the to-and-fro rotation of the capsule is repeated one pill will always fall out in the described manner.

I claim—

In a receptacle for holding pills and the like and delivering the same singly, the combination of a box $a$, having a hole $c'$ in the bottom $b$ thereof, a rotary capsule $h$ before said hole, said capsule $h$ having the hole $c^2$ therein, the disk $f$ within the box, having the hole $c^3$, and the spindle $e$, connecting said disk $f$ and capsule $h$, the disk $f$, bottom $b$, and capsule $h$ being spaced from each other for passage of the pill, in the manner set forth.

In witness whereof I have signed this specification in presence of two witnesses.

FRIEDRICH KOCH.

Witnesses:
OSCAR SCHMIDT,
ALFRED KÜHN.